United States Patent [19]

Blach

[11] 4,416,544

[45] Nov. 22, 1983

[54] DEVICE FOR MIXING, DISPERSING AND HOMOGENIZING COMPOUNDS WITH AT LEAST ONE VISCOUS COMPONENT

[76] Inventor: Josef A. Blach, Wilhelmstrasse 24, D-7144 Asperg, Fed. Rep. of Germany

[21] Appl. No.: 323,176

[22] Filed: Nov. 20, 1981

[30] Foreign Application Priority Data

Dec. 16, 1980 [DE] Fed. Rep. of Germany ....... 3047314

[51] Int. Cl.³ ............................ B29B 1/10; B01F 7/10
[52] U.S. Cl. ........................................ 366/85; 366/90
[58] Field of Search ................. 366/83, 84, 85, 297, 366/298, 299, 300, 301; 425/204

[56] References Cited

U.S. PATENT DOCUMENTS

| | | | |
|---|---|---|---|
| 2,631,016 | 3/1953 | de Laubarede | 366/297 |
| 3,618,902 | 9/1971 | Brennan, Jr. | 366/301 |
| 4,073,013 | 2/1978 | Blach | 366/301 |
| 4,236,833 | 12/1980 | Blach | 366/85 |
| 4,299,499 | 11/1981 | Buchheit | 366/301 |

Primary Examiner—Harvey C. Hornsby
Assistant Examiner—Michael Knick
Attorney, Agent, or Firm—Kenway & Jenney

[57] ABSTRACT

This invention relates to a device for mixing, dispersing and homogenizing compounds with at least one viscous component, said device exhibiting in a housing at least two parallel intermeshing shafts which can be driven in the same direction, each of said shafts having ring wheel sections disposed at an axial distance from each other, said ring wheel sections having a contour differing from a circle concentric to the shaft axis, and being spaced from each other by a distance substantially greater than the thickness of said ring disc sections, whereby the circumferential areas of the ring wheel sections of the two shafts exhibiting the greatest distance from the appurtenant shaft axis overlap.

7 Claims, 4 Drawing Figures

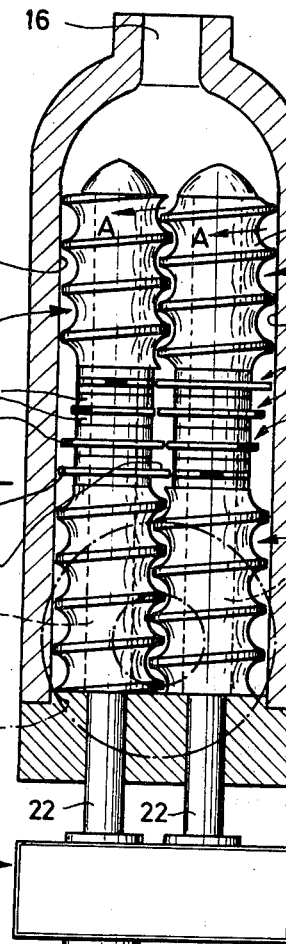
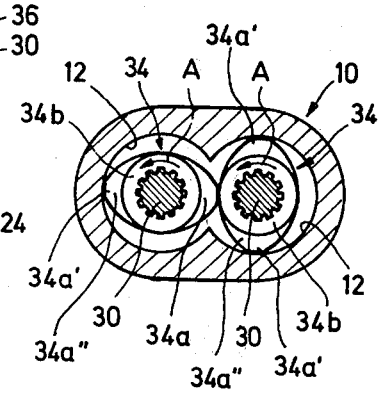
Fig. 1
Fig. 2

DEVICE FOR MIXING, DISPERSING AND HOMOGENIZING COMPOUNDS WITH AT LEAST ONE VISCOUS COMPONENT

On known devices of this type, the ring wheel sections of each shaft are disposed at very small axial distances from each other, and ring wheel sections opposite each other on adjacent shafts are offset in relation to each other in an axial direction by the thickness of one ring wheel section, thus permitting adjacent shafts to intermesh. In order to prevent intermeshing ring wheel sections on adjacent shafts from touching each other, distance ring wheels are arranged between adjacent ring wheel sections of each shaft on the core of said shaft, said distance ring wheels having the shape of circular rings concentric to the shaft axis and having a thickness which is at the most one quarter of the thickness of one ring wheel section.

On these known devices predominantly hydraulically acting compressive forces are responsible for the mixing, dispersing and homogenizing. A homogenous state, however, cannot be achieved very effectively with these compressive forces. On the other hand, the pressure differences arising in the known devices and becoming active in the compounds to be processed limit the shaft speed with regard to the maximum permissible material temperatures; thus, for example, measurements along the circumference of the ring wheel sections of known devices of the aforementioned type resulted in pressure differences in the compound to be processed of over 150 bar at less than 0.3 m/s circumferential speed (processing of polyethylene), so that the maximum permissible material temperature to be observed for instance when dispersing paints in the manufacture of paint pastes is reached at as little as 5 m/s without the desired homogeneity of the processed compounds being achieved. This is due to the fact that it is not possible to bring about the required large mass transfer in the regions of high pressure differences which are admittedly effective but small.

For Mixing, dispersing and homogenizing, the compounds to be processed are now, according to the invention, subjected to a predominant shearing stress and the compressive forces and pressure differences are simultaneously reduced to a minimum. Contrary to the known devices of the aforementioned type, this is achieved by not selecting the axial distance of the ring wheel sections from each other smaller than the thickness of the ring wheel sections, but by making the axial distance of the ring wheel sections from each other at least half as great as the thickness of the thinnest ring wheel section.

This substantially increases the effective face areas of the ring wheel sections and thus also the shearing stress on the compounds to be processed whilst at the same time reducing the compressive stress on the volume elements of the compounds to be processed, which results in a greater homogeneity of the compounds to be processed and in smaller particle sizes of the inhomogeneities with a small outlay. As a result of the narrower ring wheel sections, the free volume available for the compounds to be processed and thus also the volume of the compound which is directly involved in the homogenization process are substantially increased. This has a particularly advantageous effect in those areas in which the ring wheel sections of adjacent shafts intermesh, as the streams of compound produced by the two shafts move in opposite directions in these areas and as a result of this bring about a doubling of the shearing stress for comparatively large volumes of compound. Outside the overlap areas of the ring wheel sections of the adjacent shafts, the faces of the ring wheel sections have their full effect as a result of the almost stationary compound to be processed, so that on a device according to the invention the active surfaces are considerably larger than on the known devices of the aforementioned type. Finally, the device according to the invention brings about a considerable reduction in the average temperatures of the compound and in wear of the device, and, in addition, it is possible to process compounds in consecutive treatment phases in one and the same machine at different excess or low pressures and/or temperatures without having to connect several machines in series, as is the case with the known devices of the aforementioned type.

The fundamental advantages of the principle according to the invention become even more apparent the narrower or thinner the ring wheel sections are in comparison to their axial distance, so that on preferred embodiments of the device according to the invention the axial distance of the ring wheel sections from each other is considerably greater than the thickness of the ring wheel sections. The thickness of the ring wheel sections can be reduced until the sections no longer exhibit sufficient strength—related to the viscosity of the compounds to be processed.

On machines on which the machine housing exhibits cavities for the shafts—said cavities penetrating each other, being parallel to each other, cylindrical or conical—it has proven advisable to select the thickness of the ring wheel sections at the most identical to and preferably smaller than 10% of the diameter of the allocated housing cavity at the place concerned.

In order to achieve a continuous process a conveying effect in the longitudinal direction of the shaft is desirable, whereby the aim is to ensure, by means of an appropriate development of the device, that the material to be processed is only advanced axially but set in rotation as little as possible in order to enable the free surfaces of the shafts to become as effective as possible and to bring about a maximum shearing stress on the compounds to be processed. In order to achieve a conveying effect in the longitudinal direction of the shaft on one embodiment of the device according to the invention which is particularly advantageous in this respect, the circumferential areas of the ring wheel sections exhibiting the greatest distance from the appurtenant shaft axis are offset helically in a known manner and the axial distance of the ring wheel sections is in the order of magnitude of the pitch of the helix.

A further favourable effect on the desired maximisation of the effective free surfaces of the shafts can be achieved if, in the case of helically offset ring wheel sections, successive ring wheel sections of this type on one shaft are offset in each case by an angle of rotation roughly equal to 360°/(2 ×number of starts), whereby in order to achieve a predetermined axial conveying direction the offset of at least every second ring wheel section deviates by a few degrees from the value 360°/(2 ×number of starts).

Of course, the shafts of the device according to the invention do not have to be developed identically over their entire lengths; thus, for example, they may have the shape of a normal worm shaft for part of their length. For effective mixing, dispersing or homogenizing of compounds using the principle according to the invention, it is however, advisable to give the area of each shaft fitted with ring wheel sections a length which is at least equal to one half of the diameter of the housing cavity containing this shaft.

Further features, advantages and details of the invention can be seen from the enclosed claims and/or the following description as well as from the enclosed illustrations of two preferred embodiments of the device according to the invention:

FIG. 1 shows a horizontal section through the first embodiment;

FIG. 2 shows a section through this first embodiment after the line 2—2 in FIG. 1;

Figure 3:
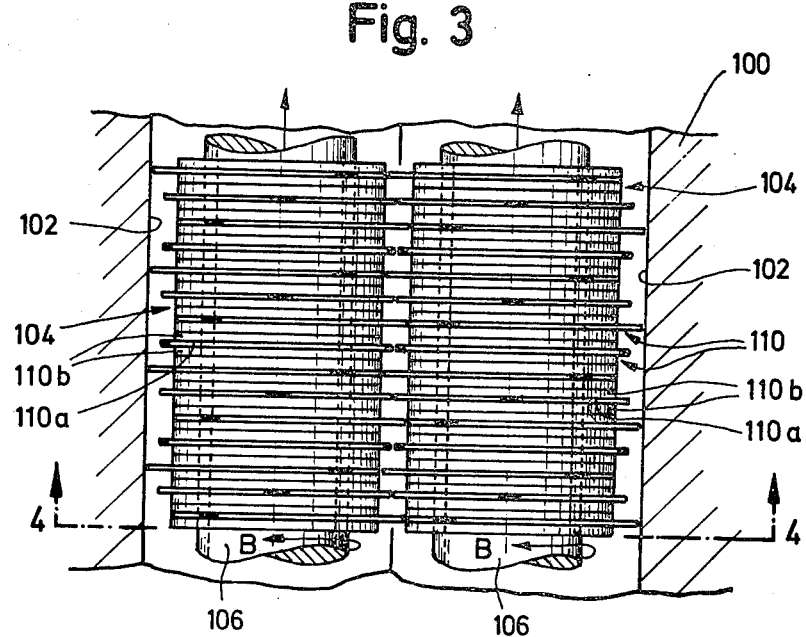
FIG. 3 shows an area of the second embodiment developed according to the invention in a representation corresponding to the representation in FIG. 1.

FIGS. 1 and 2 show a machine housing 10 with two axially parallel, cylindrical bores 12 which penetrate each other in places, a filling hole 14 opening into these bores from above and an outlet hole 16. Each of the bores 12 includes a processing shaft 20 according to the invention, said processing shaft being over-mounted with a bearing shank 22 in a rear wall 24 of the machine housing 10. A transmission 26 and motor 28 serve to drive the two processing shafts 20 in the same direction.

Each of the processing shafts 20 has a toothed core shaft 30, the rear end of which extends into the bearing shank 22. Various bush-like parts are slipped on to this core shaft, namely a worm shaft bush 32, several material processing bushes 34 developed according to the invention, as well as a further worm bush 36. In the centre of all these bushes there is a hole, the shape of which matches the contour of the core shaft 30 so that the bushes are connected to the core shaft such that they do not rotate.

In the illustrated preferred embodiment, each of the material processing bushes 34 consists of a central processing ring wheel section 34a which is disposed between distance wheel sections 34b and is in one piece with said sections. According to the invention, the distance wheel sections 34b exhibit an external contour corresponding to a circle concentric to the shaft axis, the radius of said circle being slightly smaller than the maximum radius of the opposite processing ring wheel section 34a of the adjacent processing shaft 20. In addition, the thickness (measured in axial direction) of two adjacent distance wheel sections 34b is, according to the invention, many times greater than the thickness of the adjacent processing ring wheel sections 34a.

In the illustrated embodiment, the processing ring wheel sections 34a have two opposed elevations, cams or projections 34a' and, according to the invention, processing ring wheel sections 34a which follow each other in axial direction are offset at such an angle that if both processing shafts 20 are rotated once in the direction of the arrows A, a conveying effect will result from the filling hole 14 to the outlet hole 16, not only on the worm shaft bushes 32 and 36 but also in the area of the material processing bushes 34. The elevations 34a' then form sections of a helix with conveying effect.

It is also advisable to dispose the processing shafts 20 such that they intermesh, i.e. that the adjacent worm shaft bushes 32 and 36 mesh and the elevations 34a' of the processing ring wheel sections 34a of the two processing shafts—as seen in axial direction—overlap, as can be clearly seen in FIG. 1. In this way, it is also possible to bring about the mechanical self-cleaning of the processing shafts which is known from the state of the art, although this is only possible as long as the degree of admission of the machine in the area between the two processing shafts is sufficiently large.

Since on the device according to the invention considerable distances are envisaged between the processing ring wheel sections 34a and since these sections are kept relatively narrow, the rotating elevations of the processing ring wheel sections do not drive the compound to be processed in a rotational direction to the same extent as is the case on the known devices of the aforementioned type. On the contrary, the compounds to be processed are almost stationary—with the exception of the conveying in axial direction—so that the faces 34a'' of the processing ring wheel sections 34a have their full effect.

Since in addition the mass transfer becomes smaller with increasing thickness of the processing ring wheel sections of adjacent processing shafts rotating in the same direction, the processing ring wheel sections, which are developed narrow according to the invention, result in a substantial increase in the mass transfer, which is not only conducive to the homogenization process but also leads to a sizeable reduction in the mean temperatures of the compounds to be processed.

It follows that the rotational speed of the processing shafts can be substantially increased in comparison to the known devices of the aforementioned type, as the mean shearing stress on the material to be processed can be increased until the material-dependent maximum mean product temperature is reached.

The distances of the processing ring wheel sections from each other, which have been substantially increased in comparison to the state of the art, also have the advantage that the degree of wear, which is normally particularly high in the area of the intermeshing processing ring wheel sections, is substantially reduced, which becomes apparent mainly when mixing abrasive components such as glass fibres etc. into plastics and the like.

Of course, the principle according to the invention can also be implemented on machines with more than two processing shafts.

The thickness of the processing ring wheel sections 34a should not exceed 10% of the diameter of the appurtenant bores 12, and the length of the processing shaft section developed according to the invention should be at least half as great as the diameter of the appurtenant housing bore.

Of course, the processing ring wheel sections 34a could be developed as parts separated from the distance wheel sections 34b and the adjacent distance wheel sections 34b could be combined into one single part.

Since the processing ring wheel sections 34a of the first embodiment, which is illustrated in FIGS. 1 and 2, have two elevations 34a', they act similar to a two-thread worm shaft; it is possible to achieve particularly good results according to the invention with a predetermined axial conveying direction if the offset of the angle of rotation between processing ring wheel sections 34a following each other in axial direction is approx. 90° in the case of a "two-thread worm", approx. 60° in the case of a "three-thread worm" and thus approx. 180° in the case of a "single-thread worm", whereby successive processing ring wheel sections or every second section are/is offset by a few degrees more or less than that corresponding to the aforementioned regularity.

According to a further, advantageous feature of the invention, the adjacent processing ring wheel sections 34a of two interacting processing shafts are offset at an angle of rotation slightly greater or slightly smaller than adjacent processing ring wheel sections on one and the same shaft.

Figure 4:
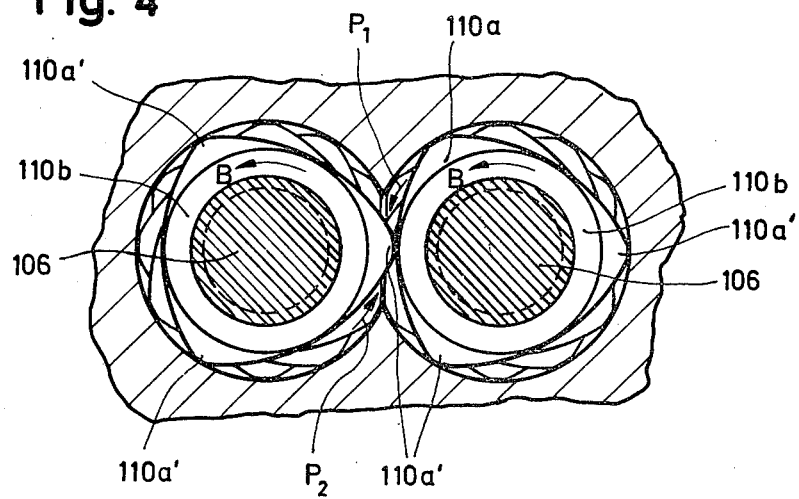
FIG. 4 shows a section through this second embodiment after the line 4—4 in FIG. 3.

FIGS. 3 and 4 show sections of the second embodiment with a machine housing 100 exhibiting axially parallel, cylindrical bores 102 which penetrate each other in places, for holding processing shafts 104. These shafts are to be driven in the same direction, i.e. in the direction of arrows B, in the same manner as for the first embodiment.

The processing shafts have core shafts 106 provided with a male thread, with material processing bushes 110 as well as worm shaft bushes (not illustrated) being screwed on to said core shafts 106, said material processing bushes consisting in each case of one processing ring wheel section 110a and distance wheel sections 110b disposed on both sides of said processing ring wheel section 110a. As can be clearly seen from FIG. 4, the processing ring wheel sections 110a, however, have three elevations 110a' in this embodiment, whereby corresponding elevations of processing ring wheel sections following each other in axial direction are offset at such an angle that the processing ring wheel sections of each processing shaft almost form a three-thread worm.

The arrows P1 and P2 in FIG. 4 illustrate how the parts of the compound to be processed which are carried along in the direction of rotation and thus also the product streams formed in this way meet each other in the areas in which processing shafts intermesh, and how they prevent each other from rotating along with the processing shafts; in contrast to this, the comparable product streams on the known devices of the aforementioned type do not meet in this way but are merely reversed.

As already mentioned, instead of circular distance wheels concentric to the shaft axes, eccentric or simply non-circular distance wheels may also be used between the processing ring wheel sections, although care should be taken to ensure that the greatest radius of these distance wheels is slightly smaller than half the axial distance of the processing shafts.

What is claimed is:

1. In a device for mixing, dispersing and homogenizing compounds with at least one viscous component, said device exhibiting in a housing at least two parallel intermeshing shafts which can be driven in the same direction, each of said shafts having a plurality of ring disc sections disposed at an axial distance from each other, said disc sections each having at least one elevation from a circle concentric to the shaft axis, wherein the circumferential areas of the ring disc sections of the two shafts exhibiting the greatest distance from their associated shaft axes, as seen in axial direction, overlap, wherein the improvement comprises said ring disc sections being spaced axially from each other by a distance that is substantially greater than the thickness of said ring disc sections, said ring disc sections on adjacent shafts being arranged opposite one another and the axial spacings along said shafts between said ring disc sections being arrayed opposite one another.

2. Device as defined in claim 1, on which the housing exhibits cylindrical or conical cavities for the shafts, said cavities penetrating each other and being parallel to each other, characterized in that the thickness of the ring disc sections is at the most identical to and preferably smaller than 10% of the diameter of the allocated housing cavity at the place concerned.

3. Device as defined in claim 1, wherein, in order to achieve a conveying effect in the longitudinal direction of the shafts, the circumferential areas of the ring disc sections exhibiting the greatest distance from the appurtenant shaft axis are offset helically and wherein the axial distance of the ring disc sections is in the order of magnitude of the pitch of the helix.

4. Device as defined in claim 1, wherein, in order to achieve a conveying effect in a predetermined longitudinal direction of the shafts, the circumferential areas of the ring disc sections exhibiting the greatest distance form the appurtenant shaft axis are offset roughly helically such that successive ring disc sections of one shaft are offset in each case by an angle of rotation of approx. $360°/(2 \times \text{number of threads})$ and the offset of at least every second ring disc section deviates by a few degrees from the value $360°/(2 \times \text{number of threads})$.

5. Device as defined in claim 1, wherein the area of a shaft having ring disc sections exhibits a length which is at least identical to one half of the diameter of the housing cavity containing said shaft.

6. Device as defined in claim 1, wherein there are shaft sections between the ring disc sections, the thickness of said shaft sections being identical to the distance of the ring disc sections from each other, and the maximum radius of said shaft sections being roughly identical to the smallest radius of the ring disc sections.

7. Device as defined in claim 1, the housing of said device exhibiting a feed opening for the processed compounds or the compounds to be processed, said housing also exhibiting an outlet opening at an axial distance from said feed opening, said housing also exhibiting cylindrical housing cavities for the shafts, said cavities penetrating each other and being parallel, wherein the axial distance of the two openings from each other is at least three times the diameter of the housing cavities.

* * * * *